United States Patent

Mattsson

[11] Patent Number: 5,877,423
[45] Date of Patent: Mar. 2, 1999

[54] METHOD FOR PROVIDING TEMPERATURE COMPENSATION FOR A WHEATSTONE BRIDGE-TYPE PRESSURE SENSOR

[75] Inventor: Olle Mattsson, Getinge, Sweden

[73] Assignee: Getinge AB, Getinge, Sweden

[21] Appl. No.: 849,416

[22] PCT Filed: Dec. 2, 1994

[86] PCT No.: PCT/SE94/01160

§ 371 Date: Aug. 1, 1997

§ 102(e) Date: Aug. 1, 1997

[87] PCT Pub. No.: WO96/17236

PCT Pub. Date: Jun. 6, 1996

[51] Int. Cl.$^6$ .................................................. G01L 19/04
[52] U.S. Cl. .............................. 73/708; 73/727; 73/726; 338/42
[58] Field of Search .............................. 73/708, 720, 721, 73/726, 727; 338/42

[56] References Cited

U.S. PATENT DOCUMENTS

| | | |
|---|---|---|
| 4,192,005 | 3/1980 | Kurtz . |
| 4,480,478 | 11/1984 | Sato et al. . |
| 4,715,003 | 12/1987 | Keller et al. . |
| 4,765,188 | 8/1988 | Krechmery et al. . |
| 5,042,307 | 8/1991 | Kato . |
| 5,116,331 | 5/1992 | Chapman ................................. 73/721 |
| 5,146,788 | 9/1992 | Raynes . |

FOREIGN PATENT DOCUMENTS 60-135717  7/1985  Japan .

*Primary Examiner*—Joseph L. Felber
*Attorney, Agent, or Firm*—Pillsbury Madison & Sutro LLP

[57] ABSTRACT

A method of compensating for differences of temperature, in a pressure sensor of the kind wherein a pressure is sensed by use of a diaphragm connected in a Wheatstone bridge circuit. First measurement points of offset output signals emanating from the bridge in the pressure sensor at a number of temperature levels are plotted in a first graph indicating the voltage as a function of the resulting resistance of the bridge, whereupon adjacent measurement points are interconnected by straight lines and calculation is effected through interpolation between the measurement points. The sensitivity of the pressure sensor such as voltage/pressure unit, is determined in a corresponding manner at different temperature levels by plotting second measurement points in a second graph indicating the sensitivity as a function of the resulting resistance in a similar way the last mentioned measurement points are interconnected by straight lines, and calculation is effected through interpolation between the measurement points. The resulting curves are processed in a computer, whereupon a signal from the pressure reading provides a directly temperature-compensated pressure value which may be read from a third graph indicative of an output signal that is proportional to the prevailing pressure.

2 Claims, 2 Drawing Sheets an appropriate sterilization range is between 101.3 kPa (1 bar) and below.

METHOD FOR PROVIDING TEMPERATURE COMPENSATION FOR A WHEATSTONE BRIDGE-TYPE PRESSURE SENSOR

BACKGROUND OF THE INVENTION

The invention concerns a method for compensation of temperature in a pressure sensor of the kind designed to convert a detected pressure into an electric signal which is registered by a measuring device.

A prior-art method used for this purpose consists of applying a number of resistances on a pressure-sensitive diaphragm, which resistances change their resistance values in response to changes in the diaphragm configuration when the diaphragm is exposed to pressure changes. As a rule, the resistances are electrically connected in a bridge circuit, of the kind known as a Wheatstone bridge.

All transducers, independently of whether they comprise resistances manufactured from thin films or thick films on an insulating material or through ion implantation in silica materials (known as piezoresistive transducers), suffer from the disadvantage of being extremely temperature-dependent. This means that the transducer output signal which is representative of a pressure at a certain moment, changes as the temperature changes, also when the pressure remains constant. This temperature dependency could, in some cases, be extremely large.

When a pressure transducer is used in applications where the temperature variations are comparatively small, it may be calibrated once the environmental conditions have stabilized somewhat. Thereafter, the effects of temperature changes are essentially negligible.

Other prior-art methods of temperature compensation consist of connecting resistances having known temperature charactersistics in different diagonals of the bridge, or of actively compensating the output signal for temperature influence by means of electronics built into the transducer. However, in this case also, the electronics are exposed to the temperature variations and consequently these variations need again be considered. As long as the temperature variations remain small it is, however, possible to obtain acceptable measurement results by any one of the above methods.

In thermal sterilization by means of vapor in an autoclave the conditions are, on the other hand, very difficult to master because during one sequence the pressure varies from between approximately 30 mbar absolute pressure and approximately 5 bar absolute pressure, i.e. a pressure ratio of approximately 1:150. At the same time, the temperature varies between approximately 20° C. and 140° C. In addition, the changeovers between maximum and minimum values and vice versa, both respect to pressure and temperature, take place rapidly, and several times, over a comparitively short period, during one process.

However, the above-mentioned prior-art stabilizing methods are quite insufficient in this application to meet the requirements as to accuracy with respect to the precision of the measured values in sterilization. Particularly in the case of low pressures the percentage deviations of measured values are quite considerable, often several hundred percent. At the same time, low pressures are an important measuring range in this connection.

For such an extreme activity as vapor sterilization various measures therefore have been taken to prevent the effects of temperature on the pressure sensor. Examples of such measures are isolation of the pressure sensor from the autoclave enclosure where the pressure is measured, transfer of the pressure to the sensor by way of, for instance, an oil buffer, a water bag or the use of capillary tubes. Another way is to cool the pressure sensor to prevent the pressure sensor from following the temperature increase inside the autoclave enclosure.

However, all these various previously known methods of preventing a temperature rise in the pressure sensor cause cavities to form between the autoclave chamber and the sensor. Such cavities are not desired, and normally they are not accepted by established standard specifications, because inside them an environment is created that favors collection and growth of micro-organisms. Instead, a desired end is to be able to position the sensing diaphragm of the pressure sensor directly in the wall of the autoclave enclosure, without using any intermediary tubings or pipings.

Of course, it is always possible to position a separate temperature sensor on or adjacent the diaphragm for the purpose of measuring the existing temperature during the pressure sensing operation. However, this does not solve the problem, since the pressure sensor only provides information on the temperature at its place of mounting on the diaphragm and not on the actual effects to which the pressure-sensitive resistances are exposed.

SUMMARY OF THE INVENTION

The subject invention provides a method making it possible to position the diaphragm of the pressure sensor, as desired, directly in the wall of an autoclave chamber, in order to eliminate undesired cavities while at the same time temperature compensation is achieved in all temperature ranges that are relevant in the autoclave process, providing excellent measurement results within the measurement range in question. The type of pressure sensor that may be considered in this connection is one which detects a pressure by means of a diaphragm which is connected in an electric bridge circuit consisting of four resistances interconnected in series in a quadrangle, known as a Wheatstone bridge, those resistances changing the values in response to changes of configuration of the diaphragm caused by changes in the detected pressure.

BRIEF DESCRIPTION OF THE DRAWINGS

The invention will be defined in closer detail in the following with reference to the accompanying drawings wherein.

DETAILED DESCRIPTION

Figure 1:
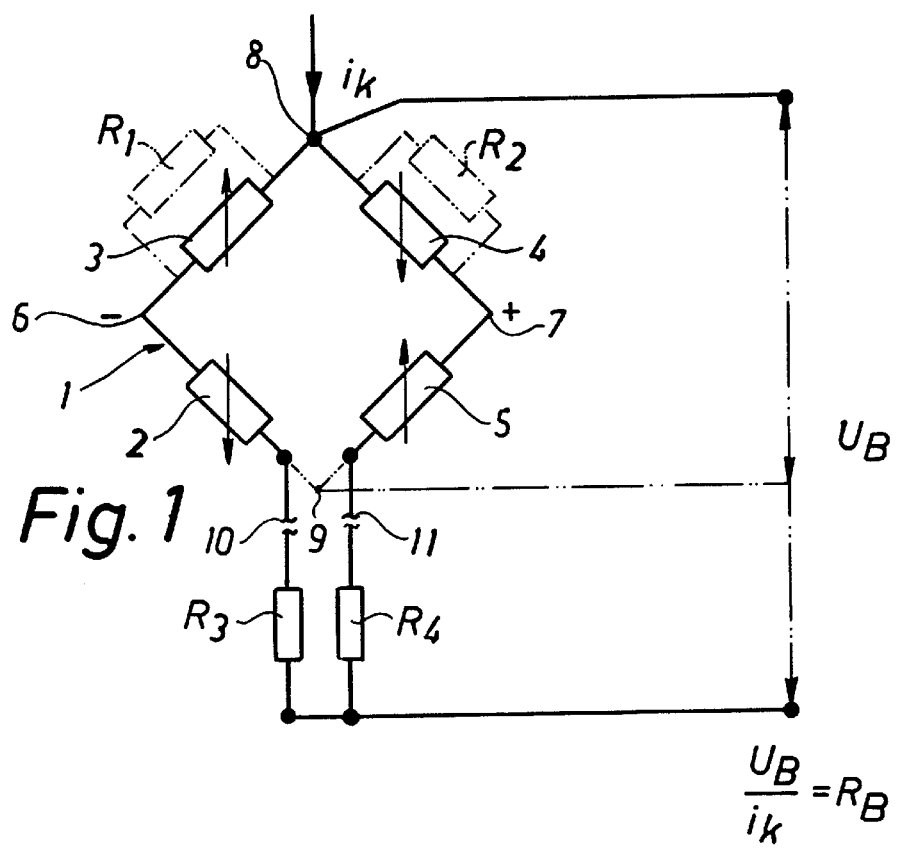
FIG. 1 illustrates a bridge circuit which serves as the measuring means in a pressure sensor, not illustrated, in an autoclave and which is connected to the diaphragm of the pressure sensor.

The method in accordance with the invention is intended to be utilized with the type of pressure sensor wherein the sensor is provided with a diaphragm which alters its configuration in response to pressure changes and which is connected with an electrical bridge circuit 1. As appears from FIG. 1, this bridge circuit consists of four interconnected resistances 2, 3, 4, and 5 which are connected in series in quadrangle and form a circuit generally referred to as a Wheatstone bridge. The resistances 2, 3, 4, 5 change their values primarily in response to changes of the configuration of the diaphragm, but are affected also by changes in temperature. In order to obtain an electrical measurement signal in two diagonally opposite points 6, 7 in the bridge circuit 1 when measuring a pressure, two oppositely positioned points 8, 9 in the bridge circuit 1 are supplied with current or voltage. This supply of current or voltage is constant, in order not to affect the output in points 6, 7.

When the supply is in the form of a constant voltage, the voltage drop between the two supply points 8, 9 will always be constant, independently of how the four resistances 2, 3, 4, 5 change their values individually. The output signal between the two other points 6, 7 follows the values of the four resistances in the conventional manner.

However, if the bridge 1 is supplied with constant current, it becomes possible to also measure the total resistance of the bridge across the two supply points 8, 9. This magnitude is an excellent reference of the temperature dependency of the pressure sensor, since it is directly related to the resistances 2, 3, 4, 5 that are active for pressure readings.

Figure 2:
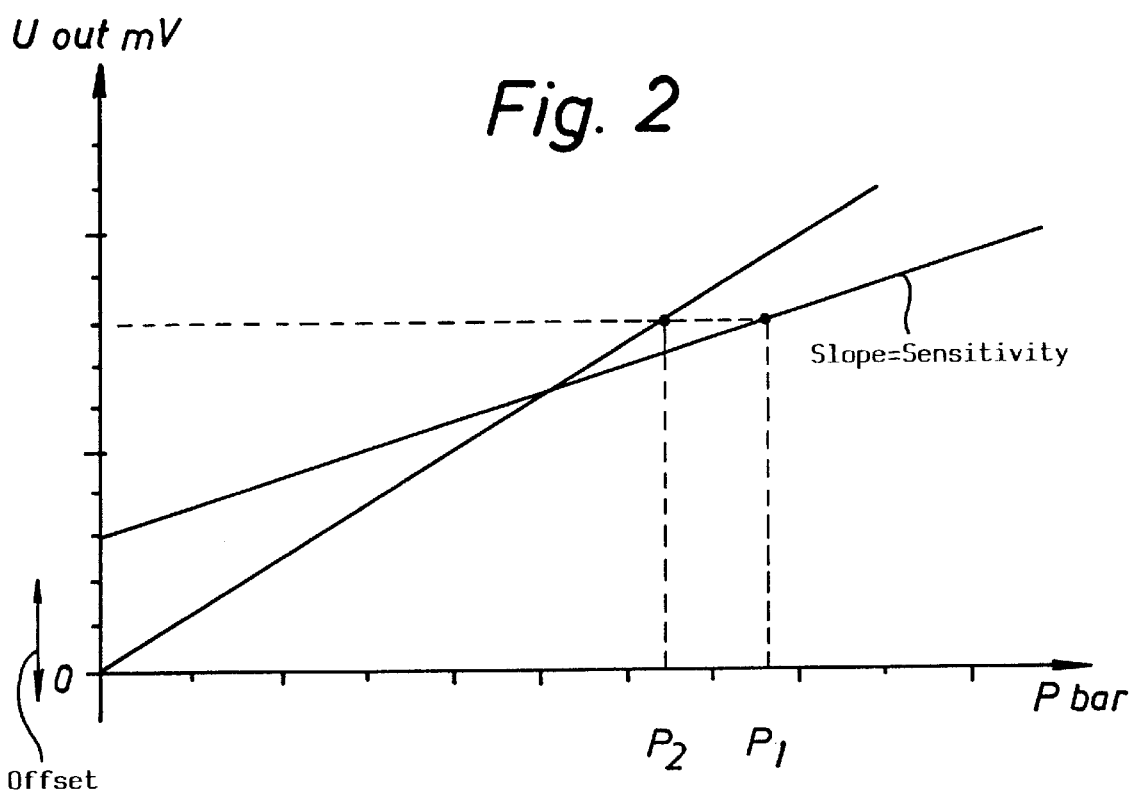
FIG. 2 is a graphical representation wherein the slope of the curves illustrate the sensitivity of the pressure sensor expressed in mV/bar.

Each pressure sensor has a sensitivity expressed, for instance in mV/bar. In the ideal case, the output signal from a pressure sensor, as illustrated in FIG. 2, forms a straight line departing from zero and with a slope corresponding to the sensitivity of the pressure sensor. In reality, the zero point (offset) as well as the slope (sensitivity) are affected by the temperature.

In the manufacture of pressure sensors, the offset and slope are measured as functions of the total bridge resistance of the associated pressure sensor across the temperature range relevant to the pressure sensor. The bridge resistance $R_B$ is the relation between the voltage $U_B$ across the bridge 1 and the supply current $i_k$ through the bridge. The table below relates to a certain pressure sensor the temperature dependency of which is measured from room temperature at intervals of 20° C. up to approximately 140° C. The values corresponding to the offset and the sensitivity are registered as functions of the bridge resistance at seven different temperature levels in accordance with the example given. The measured values are stored in the memory of a computer and are the data on which the temperature compensation calculations are based.

| $R_B$ | Sensitivity | Offset |
| --- | --- | --- |
| 3164 | 90.70 | 5.11 |
| 3285 | 90.73 | 5.14 |
| 3407 | 91.08 | 5.02 |
| 3570 | 91.50 | 4.83 |
| 3744 | 92.25 | 4.59 |
| 3900 | 93.40 | 4.40 |
| 4152 | 94.42 | 4.57 |

Figure 3:
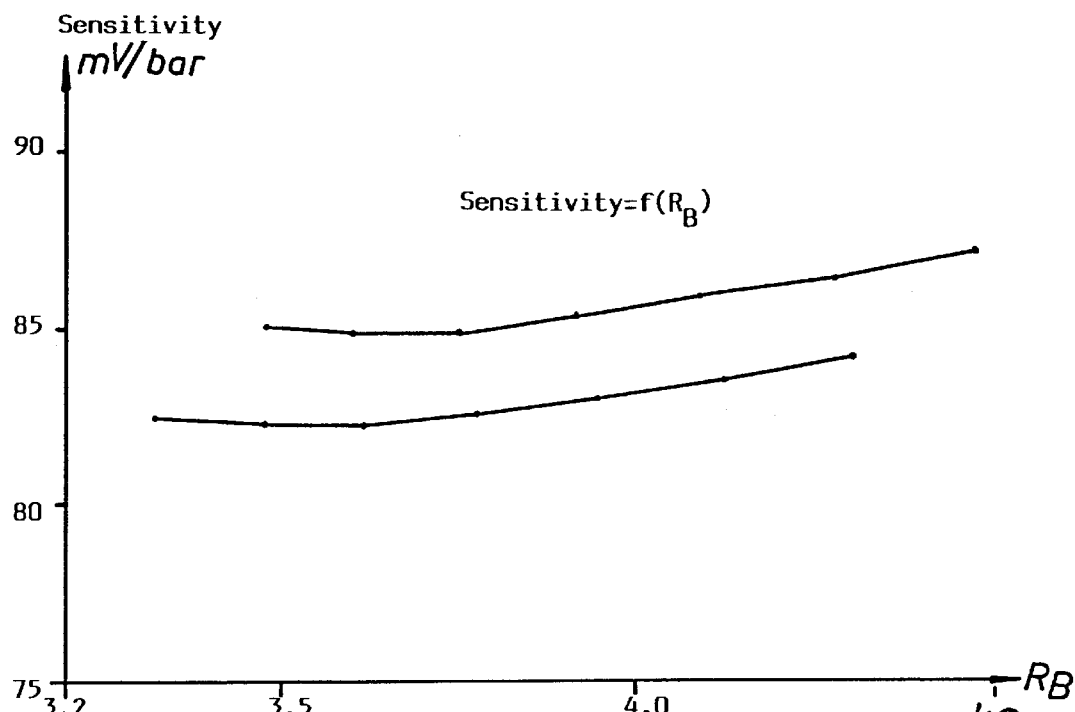
FIG. 3 is a graphical representation wherein the curves represent the sensitivity of two different pressure sensors as the function of the resulting resistance across the bridge circuit.
Figure 4:
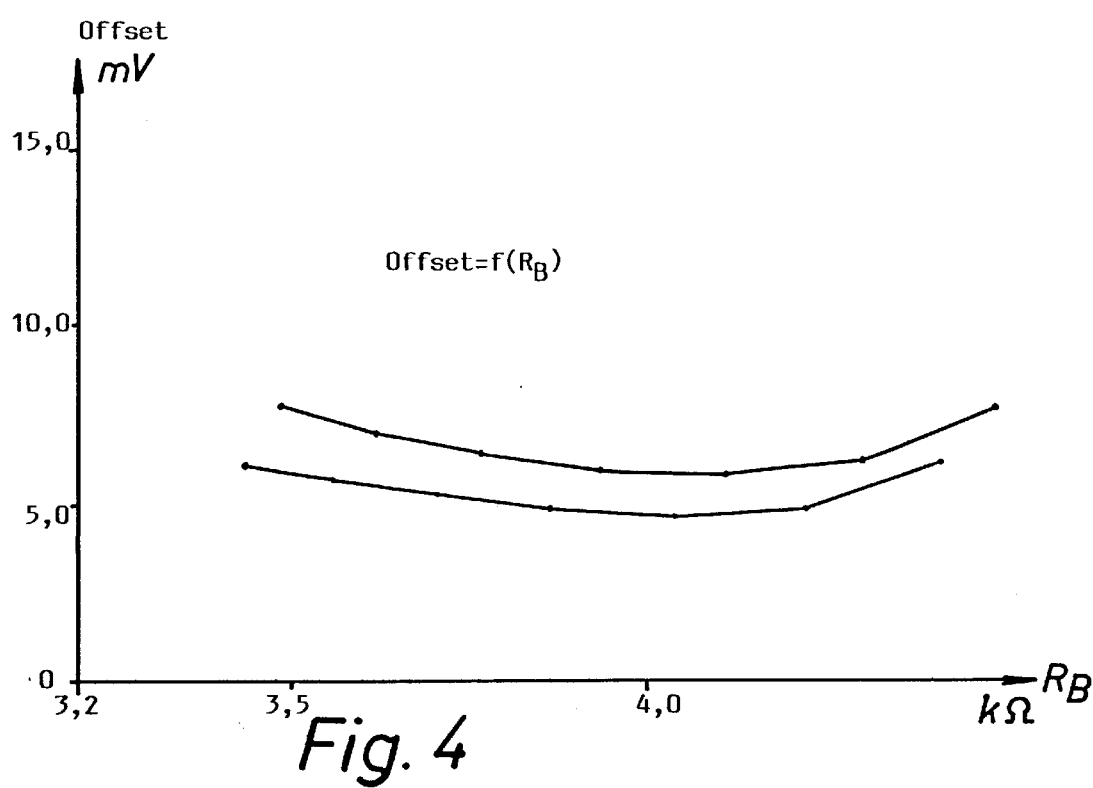
FIG. 4 is a graphical representation wherein curves represent a so called offset with respect to two different pressure sensors as a function of the resulting resistance across the bridge circuit.

In FIG. 3 is shown an example of a graphical representation wherein a couple of curves illustrate the measured values of the sensitivity of a couple of pressure sensors as a function of $R_B$. In FIG. 4 is shown in a corresponding manner a graphical representation of the offset in a couple of pressure sensors as a function $R_B$. The intervals between adjacent measurement points are interconnected by means of straight lines and the calculation is affected thereafter by interpolation between the break points, which is a simplification of a continuous function.

By treating each individual pressure sensor separately in this way, and feeding in its characteristic values into a computer full, temperature compensation is obtained at each temperature level as a result of the computer calculation. In FIG. 2, dotted lines illustrate how, in the case of an output signal, a pressure value $P_1$ is obtained in the subject case, whereas after the temperature compensation the more correct value $P_2$ is obtained.

In FIG. 1, two resistances $R_1$ and $R_2$ are indicated, these resistances being connected in parallel across reistances 3 and 4, respectively, and being inserted for the purpose of coarse temperature compensation. In addition, a couple of resistances $R_3$ and $R_4$ are connected, the purpose of which is to minimize the offset. Advantageously, these resistances $R_1$, $R_2$, $R_3$, $R_4$ can, however, be positioned in the control system, where they are exposed to smaller temperature variations than they are when positioned closely adjacent a pressure sensor. This is illustrated by dash and dot lines, and by a line discontinuity 10 and 11, respectively. The coarse compensation obtained by means of these resistances $R_1$, $R_2$, $R_3$, $R_4$ requires less correction of the computer software which considerably increases the measurement accuracy.

I claim:

1. A method of providing temperature compensation for a pressure sensor in which pressure is sensed by a diaphragm connected in circuit with a Wheatstone bridge having four resistances connected in series such as to provide output valves which are related to changes in pressure exerted on the diaphragm, said method comprising the steps of:

(a) supplying the bridge at two diagonally opposite points with a constant current while the bridge is located at a place of measurement;

(b) supplying output signals from the bridge to a computer which is unaffected by temperature variations;

(c) plotting on a first graph a plurality of first measurement points representing offset of the pressure sensor at a plurality of temperature levels, indicating voltage as a function of resulting resistance of said bridge;

(d) on said first graph, interconnecting neighboring ones of said points by straight lines, and effecting calculation, through interpolation between said points;

(e) determining the sensitivity of the pressure sensor in terms of voltage relative to pressure, in a corresponding manner, at each of a plurality of temperature levels, by obtaining and plotting on a second graph a plurality of second measurement points indicating said sensitivity as a function of the resulting resistance of said bridge;

(f) on said second graph, interconnecting neighboring ones of said second measurement points by straight lines, and effecting calculation, through interpolation between said second measurement points;

(g) processing said first and second graphs in said computer to provide a third graph on which signals from the bridge directly provide corresponding temperature-compensated pressure valves indicative of output signals proportional to respective prevailing pressures.

2. The method of claim 1, further comprising:

preparing said Wheatstone bridge for use in step (a), by positioning two first resistances in parallel in said circuit with respective ones of two of said four resistances of said Wheatstone bridge, for providing coarse temperature compensation, and by positioning two second resistances in series in said circuit with respective others of said four resistances of said Wheatstone bridge, for minimizing deviation from zero of output signals from said bridge in an environment wherein temperature variations are smaller than are temperature variations closer to said bridge.

* * * * *